United States Patent Office 3,333,659
Patented Aug. 1, 1967

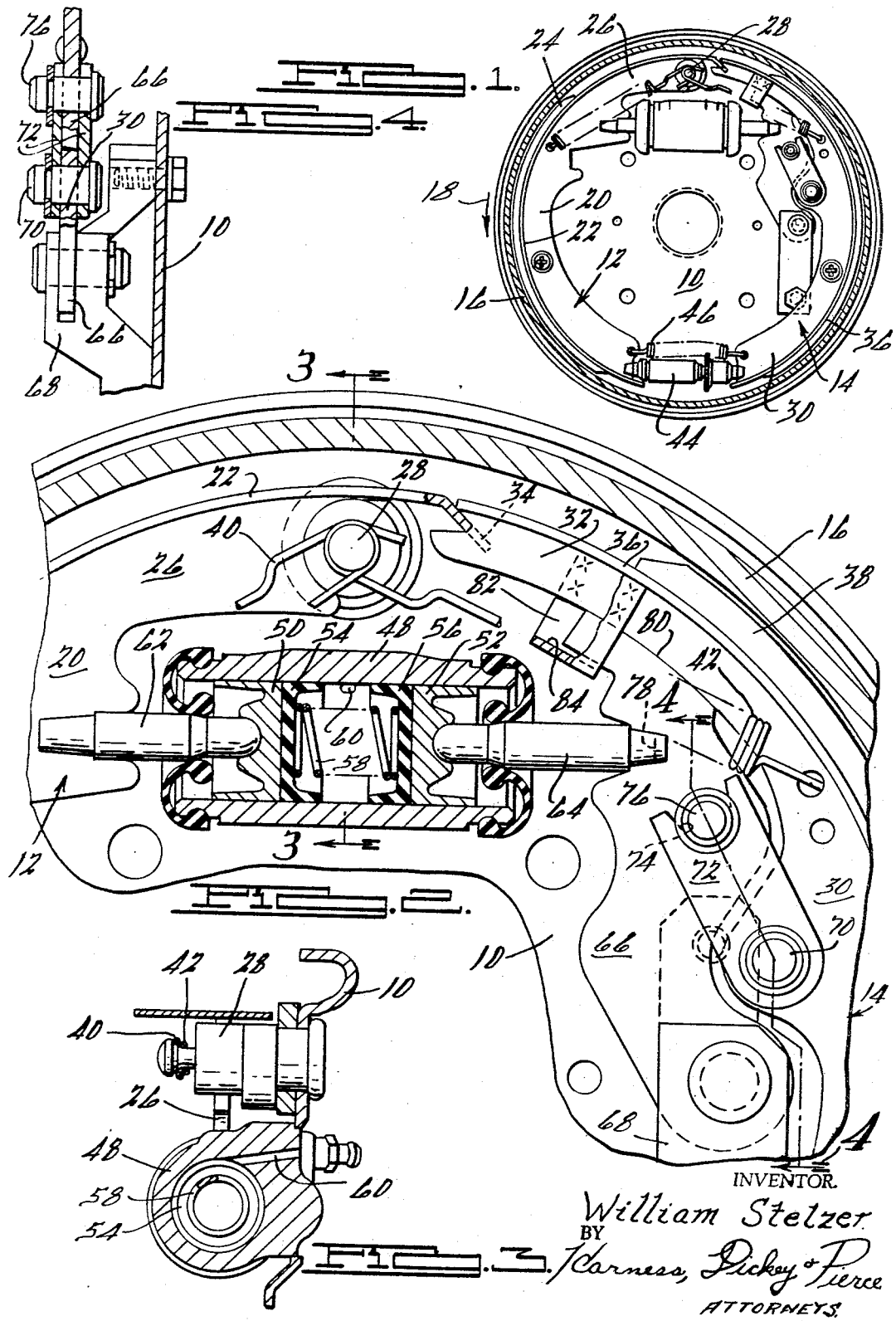

3,333,659
SELF-ENERGIZED BRAKE
William Stelzer, Bloomfield Hills, Mich., assignor to Kelsey-Hayes Company
Filed June 25, 1965, Ser. No. 466,980
3 Claims. (Cl. 188—78)

This invention relates to hydraulic brake systems, and particularly to a drum brake having means for controlling the torque output of the brake.

It is an object of the present invention to provide a hydraulic drum brake which is operable to regulate the braking torque so that it is proportional to master cylinder pressure or pedal effort.

It is another object of the present invention to provide a drum brake which is self energized to a rather high degree yet which does not suffer from the uncontrollability commonly associated with highly energized brakes.

It is another object of the present invention to provide a brake which is capable of producing a sufficiently high torque output per unit of pedal effort as to substantially reduce or eliminate the need for a power assist device.

It is still another object of the present invention to provide a brake in which the anchoring force operates to return a volume of fluid under pressure to the system thereby reducing the fluid displacement requirements of the master cylinder and enabling the use of a master cylinder of smaller diameter.

It is still another object of the present invention to provide a controlled torque drum brake in which the applying force is not opposed or the efficiency of the brake is not reduced when the brake torque is within the desired limits and which functions to modify the brake torque only when the brake torque is excessive.

It is a further object of the present invention to provide a brake of the above character incorporating means for reducing the area of contact between the shoes of the brake and the brake drum upon the occurrence of excessive torque in order to achieve a reduction in the braking torque.

These and other objects of the present invention will become apparent from the following detailed description, taken in conjunction with the accompanying drawings, wherein:

FIGURE 1 is an elevational view of a brake made in accordance with the present invention, the brake being shown within association with the sectionally illustrated drum, FIG. 2 is an enlarged fragmentary view of a portion of the structure illustrated in FIG. 1, and FIGS. 3 and 4 are sectional views of the structure illustrated in FIG. 2, taken along the lines 3—3 and 4—4 thereof, respectively.

Referring now to the drawings and particularly to FIG. 1, the brake of the present invention incorporates a standard sheet metal backing plate 10 adapted to be bolted to an axle housing, steering knuckle, or other nonrotating part of the vehicle adjacent a wheel. The backing plate 10 serves as a mounting for a pair of brake shoes 12 and 14 which are engageable with the braking flange of a brake drum, illustrated in sectional view at 16. It will be assumed that the brake drum 16 rotates in the direction of the arrow 18 during forward motion of the vehicle; the brake shoe 12 therefore constitutes the primary brake shoe and the brake shoe 14 constitutes the secondary brake shoe. The primary brake shoe 12 is provided with an arcuate web 20 which is made from stamped sheet metal and lies parallel to the backing plate 10. It is joined to a segmentally cylindrical ledge or table 22 to which a brake lining 24 is secured. The web 20 has a toe or extension 26 which is engageable with a fixed anchor 28 fixed to the top of the backing plate 10. The secondary shoe 14 has a web portion 30 made from sheet metal and disposed in a plane parallel to the backing plate 10. The web 30 has a heel or extension 32 at its upper end which is receivable in a slot 34 formed in the table 22 of the primary brake shoe 12. The web 30 is connected to a segmentally cylindrical sheet metal table 36 on which a friction lining 38 is bonded. The extension 26 of the primary brake shoe 12 is urged into engagement with the anchor 28 by means of a heavy return spring 40 connected between the web 20 and the anchor 28 while the extension 32 of the secondary brake shoe 14 is urged into engagement with the table 22 of the primary brake shoe 12 by a return spring 42 connected between the web 30 and the anchor 28. The return spring 42 is of lesser strength than return spring 40 and, thus, the position of the two shoes 12 and 14 is controlled by the location of the anchor 28 and the engagement of the primary brake shoe 12 therewith. It will be seen that an adjacent pair of ends of the brake shoes 12 and 14 are connected by means of an adjustable strut 44. The shoes 12 and 14 are maintained in engagement with the strut 44 by a spring 46.

The brake shoes 12 and 14 are urged into braking engagement with the drum 16 by means including a wheel cylinder 48 mounted on the backing plate 10 immediately beneath the anchor 28. A pair of pistons 50 and 52 carrying cup seals 54 and 56 are disposed within the cylinder 48 with a coil spring 58 positioned therebetween. Fluid under pressure is admitted to the wheel cylinder 48 between the pistons 50 and 52 through a port 60. The piston 50 will be seen to be pivotally connected to the primary brake shoe 12 by means of a pivoting link 62 while the piston 52 is pivotally connected to the secondary brake shoe 14 by means including a pivoting link 64. When the wheel cylinder 48 is pressurized, the pistons 50 and 52 are moved radially outwardly to cause the linings 24 and 38 to make contact with the brake drum 16. Assuming that the drum is rotating in the direction of the arrow 18, the friction between the drum and the brake linings will tend to carry the brake shoes 12 and 14 in a counterclockwise direction. Such movement is transmitted to a lever 66 which is pivoted at its lower end to a bracket 68 welded to the backing plate 10. The lever 66 will be seen to lie in the same plane as the shoe web 30. The web 30 of the secondary shoe 14 is provided with a pivot pin 70 on which are pivotally mounted a pair of links 72 having semicylindrical recesses 74 at their ends adapted to receive and engage a pin 76 carried by the lever 66. The pin 76 is located between the bracket 68 and a recess 78 formed in the lever 66 for the reception of the link 64. In the forward direction of travel the anchoring load of the brake shoes 12 and 14 is transmitted by the links 72 to the pin 76. This load is then distributed between the bracket 68 and the piston 52. The reaction load or anchoring force received by the piston 52, therefore, is only a portion of the entire anchoring load of the shoes. The bulk of the load is borne by the bracket 68 but the direction of force of the secondary shoe 14 on the links 72 is such that the links 72 attempt to rotate the lever 66 in a counterclockwise direction. The magnitude of this angular movement will depend entirely upon the extent of circumferential movement of the brake shoes 12 and 14.

The end of the lever 66, remote from its point of pivotal connection to the bracket 68, abuts the radially inner periphery of the web 30 of the secondary brake shoe 14 at an arcuate surface 80. By this means the lever 66 forms a mechanical connection between the link 64 and the secondary brake shoe 14 for the purpose of transmitting the radially outward force generated by the piston 52. An important feature of the invention resides in the use of a member 82 which is welded to the extension 32 of the secondary shoe web 30. The member 82 is of generally U-shape and extends radially inwardly from the web 30 to define an opening for the reception of the free end of the lever 66. The member 82 has an abutment surface 84 engageable by the lever 66 as the lever is forced radially inwardly by the secondary shoe 14 during braking. It will be noticed that a clearance exists between the lever 66 and the abutment surface 84. The magnitude of this clearance determines the extent of movement of the shoes 12 and 14 which will be permitted before the device of the present invention begins a torque controlling function.

It will be apparent to those familiar with vehicle brakes that the brake described herein represents an improvement in the so-called duo-servo type brake in which the torque output of the primary brake shoe multiplies the input force acting on the secondary brake shoe. In duo-servo brakes it is ordinarily necessary to use linings which possess a limited coefficient of friction with the drum and have a limited arc of contact with the drum to avoid excessive and erratic torque output. Excessive torque causes the brakes to grab and makes them uncontrollable. In the brake of the present invention the arc of contact of the linings 24 and 38, and the coefficient of friction of such linings, are greater than in standard duo-servo brakes.

By this means the frictional coupling between the shoes 12 and 14 and the drum 16 is increased and the brake will deliver a greater torque output for a given pressurization of the cylinder 48. The brake is distinguished by the provision of means for limiting the amount of the torque output compared to the applied brake pressure to prevent uncontrollable or erratic performance.

The rotation of the drum in the direction of the arrow 18 attempts to produce rotation of the shoes 12 and 14 in the same counterclockwise direction. The torque applied to the shoes will angularly move the lever 66 in a counterclockwise direction about its pivot point against the hydraulic pressure acting on the piston 52. This will cause the piston 52 to move to the left, thereby reducing the volume of hydraulic fluid required by the cylinder 48. This enables the use of a master cylinder having a smaller cross-sectional area with the result that a given effort on the pedal will produce a higher fluid pressure in the brake system.

In a brake of the present invention which has the particuluarly geometric relationship of parts, the piston 52 travels to the left at three-and-a-half times the velocity of the peripheral movement of the secondary shoe 18. This movement is limited by the clearance space between the free end of the lever 66 and the abutment surface 84. At the end of travel of secondary shoe 14, when the lever 66 contacts the abutment surface 84, the lever 66 pulls the heel or extension 32 of the secondary brake shoe 14 away from the drum 16. A normal brake shoe has sufficient elasticity to allow a deformation of the shoe 14 adequate for the desired reduction in radial pressure against the drum at the heel 32, but, if necessary, the elasticity of the shoe 14 may be increased by making the portion of the web 30 adjacent the trailing end of the lining 38 of reduced radial thickness. Pulling the heel 32 of the secondary shoe 14 away from the drum reduces the arc or area of contact of the lining 38 with the drum to effect a reduction in brake torque. By this means a balance is reached where the hydraulic pressure acting against the piston 52 balances the force imparted to the piston 52 through the lever 66. The torque output of the brake is thereby controlled so that it is directly proportional to the hydraulic pressure acting against the piston 52.

When the brakes are applied while the vehicle is moving in a reverse direction, the piston 52 applies brake force to the secondary shoe 14 through contact of the lever surface 80 with the web 30. It will be noted that a shorter movement of the piston 52 is required to a given movement of the shoe 14 because the travel of the surface 80 is greater than the concurrent movement of the link 64 and also because the surface 80 has the shape of an arc generated about the axis of the brake and the required movement of the piston is, therefore, not influenced by the circumferential movement of the brake shoes 12 and 14, as in conventional duo-servo brakes. This reduces the fluid requirement of the brake. While the brake of the present invention does not provide for control of torque during reverse braking, this is not as significant as in forward braking because of the lower speed at which the vehicle is normally driven in reverse. Also, the lining 38 of the shoe 14 has a lower coefficient of friction than the lining 24 of the shoe 12, and in reverse braking the lower coefficient of friction shoe becomes the primary acting shoe, which produces a lower torque than if the situation were reversed.

The brake illustrated herein is not shown as being equipped with an automatic adjuster, but it will be readily apparent to those skilled in the art that it may be provided with anyone of a number of different automatic adjusters which have been designed for conventional duo-servo brakes.

While the preferred embodiment illustrated herein is well calculated to fulfill the objects above stated, it will be apparent that the invention is susceptible of modification, variation and change without departing from the fair meaning or proper scope of the subjoined claims.

What is claimed is:

1. A drum brake including a backing plate, a pair of arcuate brake shoes mounted on said backing plate and expandable into engagement with a rotatable drum, means connecting said brake shoes to transmit braking torque therebetween, a brake cylinder disposed between said brake shoes and having a pair of pistons operable to expand said brake shoes into contact with said drum, a lever pivotally mounted on said backing plate and operatively connected to one of said pistons, said lever having a surface engageable with one of said brake shoes for expanding said one brake shoe into contact with said drum upon the outward movement of said one piston, and means interconnecting said one shoe and said lever for transmitting the braking torque of said shoe to said lever in one direction of rotation of said drum, said lever having a connection to said one shoe operable to apply a force thereto positively pulling at least a portion of said one shoe away from said drum upon a predetermined pivotal movement thereof.

2. A drum brake including a backing plate, a pair of arcuate brake shoes mounted on said backing plate and expandable into engagement with a rotatable drum, means connecting said brake shoes to transmit braking torque therebetween, a brake cylinder disposed between said brake shoes and having a pair of pistons operable to expand said brake shoes into contact with said drum, one of said brake shoes having a radially deflectable portion provided with an abutment surface, a lever pivotally mounted on said backing plate and operatively connected to one of said pistons, said lever having a surface engageable with said one brake shoe for expanding said one brake shoe into contact with said drum upon the outward movement of said one piston and said lever having a portion thereof engageable with said abutment surface on said one shoe operable to bias the deflectable portion thereof in a direction away from said drum upon a sufficient movement of said lever in response to braking torque in one direction of rotation of the drum.

3. A drum brake including a backing plate, a pair of arcuate brake shoes mounted on said backing plate for engagement with a rotatable drum, means floatingly connecting said braking shoes at an adjacent pair of ends thereof, a brake cylinder disposed between the other ends of said brake shoes and having a pair of pistons operable to radially expand said brake shoes, a pair of links disposed one between one of said pistons and one of said brake shoes, a lever mounted on said backing plate engageable with one of said links, a load transmitting member pivotally connected between one of said brake shoes and said lever for transmitting the braking torque of said brake shoes to said lever and whereby a portion of said braking load will be taken by said one piston, and means on said lever operable to apply a force to one of said shoes tending to distort a portion of said shoe away from said drum.

References Cited

UNITED STATES PATENTS

| 2,122,296 | 6/1938 | Russell | 188—78 |
| 2,382,268 | 8/1945 | Stelzer | 188—152 |
| 2,385,168 | 9/1945 | Stelzer | 188—152 |
| 3,128,846 | 4/1964 | Stelzer | 188—78 |

MILTON BUCHLER, *Primary Examiner.*

B. S. MOWRY, T. W. BUCKMAN, *Assistant Examiners.*